J. SADLER.
Machines for Welding Together Sections of Tubing.

No. 155,260. Patented Sept. 22, 1874.

UNITED STATES PATENT OFFICE.

JAMES SADLER, OF NEW YORK, N. Y.

IMPROVEMENT IN MACHINES FOR WELDING TOGETHER SECTIONS OF TUBING.

Specification forming part of Letters Patent No. 155,260, dated September 22, 1874; application filed September 5, 1874.

*To all whom it may concern:*

Be it known that I, JAMES SADLER, of the city, county, and State of New York, have invented a new and useful Improvement in Tube-Welding Machines, of which the following is a specification:

This invention relates to machines designed for welding boiler-tubes when they are to be repaired by attaching pieces of tubes to their ends, the machine to be used for welding tubes for all the purposes for which it may be adapted; and it consists of a machine having two short cylinders on the ends of two rotating shafts, the tube being welded between the said rotating cylinders, the upper cylinder being made adjustable and governed by a pressure-lever and spring attached to an adjustable bracket.

Figure 1:
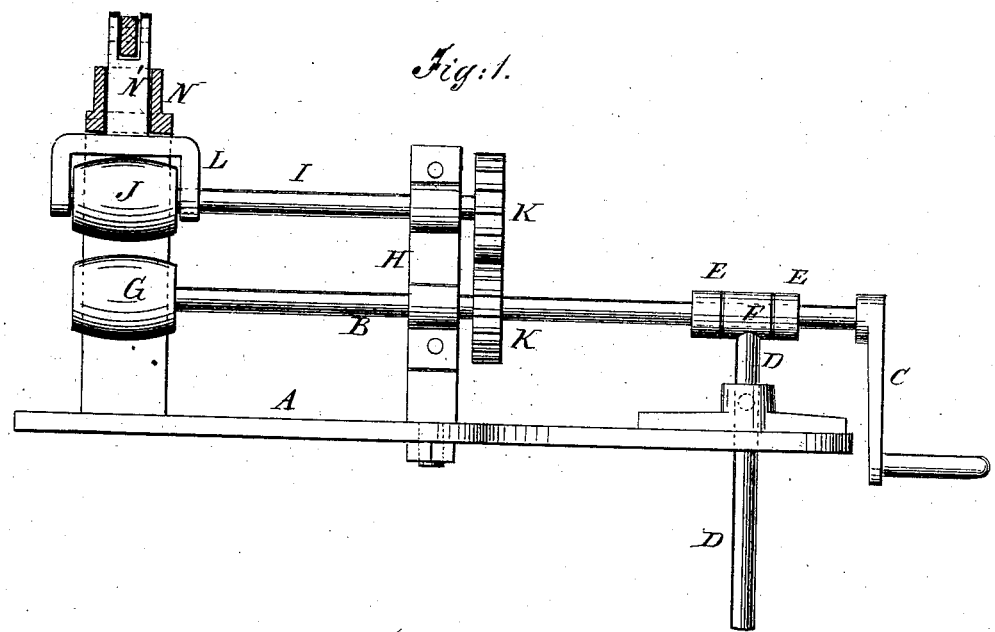
Figure 2:
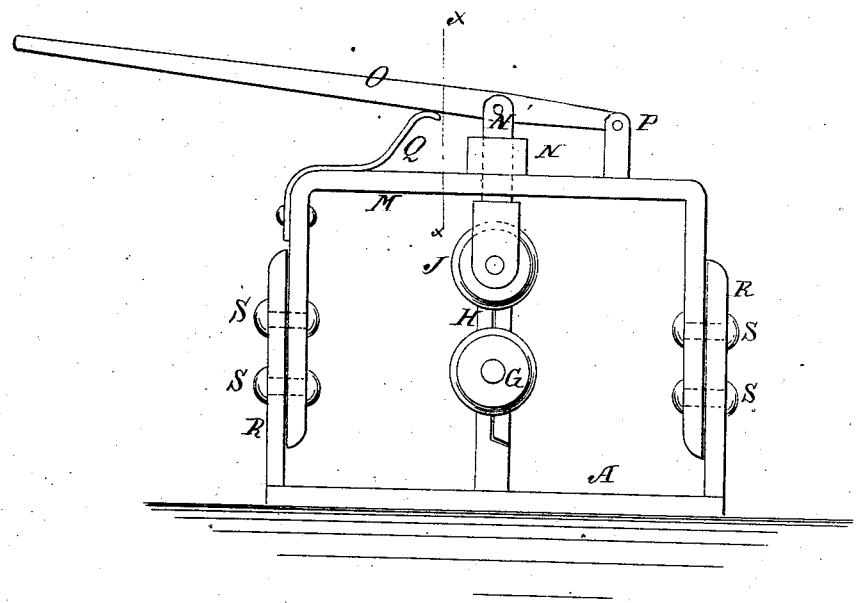

Figure 1 is a side view of the machine, partly in section, as on the line $x$ $x$ of Fig. 2. Fig. 2 is a front-end view.

Similar letters of reference indicate corresponding parts.

A is the bed-plate. B is the driving-shaft, which is rotated by the crank C and supported in a box in the stand D. This stand passes down through the bench upon which the machine is operated, and which allows the machine to turn as on a pivot. E E are collars on the shaft, which bear against the head F of the stand to prevent longitudinal motion. G is one of the welding-cylinders on the end of this shaft B. H is a box-stand for the support of the two shafts. I is the upper shaft, carrying the other welding-cylinder, J. This shaft is supported at one end by the box-stand H, and is rotated by means of the gear-wheels K K. The other end of this shaft is supported by the adjustable bracket L in the double angle-bar M. N is a socket on this bar, through which passes the shank N' of the bracket L. O is the lever pivoted in the top of the shank N'. P is the fulcrum of this lever. Q is a spring, which bears upward against the lever with sufficient force to raise the welding-cylinder when the lever is at rest.

When the tube is being welded power is applied to the lever, by means of which any required amount of pressure is given to the tube.

The angle-bar M is connected with the bed-plate A by means of the two stands R R and rivets S.

The pieces welded to the tube are six inches (more or less) in length. The lower welding-cylinder overhangs the box in the stand H to allow of this.

The cylinders are made convex, and the tube to be welded is slipped onto the lower cylinder, so that the joint will be between the middle of the cylinders, when, by means of the lever, the upper cylinder is pressed down onto the tube while the cylinders are rotated. The tubes are heated to a welding heat where they are joined, and are stuck together, one being expanded to allow it to lap onto the other. This expanding of one of the tubes is readily done in the machine as a preparation for welding.

With this machine the labor of welding tubes is reduced to a very small amount, while the work is performed in the most rapid and superior manner.

Having thus described my invention, I claim as new and desire to secure by Letters Patent—

A machine for welding tubes, consisting of bed-plate A, stand D, shafts B and I, box-stand H, gear-wheels K K, cylinders G and J, bracket L, double angle-bar M, lever O, and spring Q, arranged to operate as and for the purposes described.

JAMES SADLER.

Witnesses:
   T. B. MOSHER,
   ALEX. F. ROBERTS.